United States Patent
Thomas et al.

(10) Patent No.: US 8,834,033 B2
(45) Date of Patent: Sep. 16, 2014

(54) BALL BEARING HAVING SEGMENTED AND INTEGRAL RACES

(71) Applicant: Ford Global Technologies, LLC, Dearborn, MI (US)

(72) Inventors: Steven G. Thomas, Bloomfield Hills, MI (US); Michael Tekletsion Berhan, Sylvania, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 2 days.

(21) Appl. No.: 13/660,310

(22) Filed: Oct. 25, 2012

(65) Prior Publication Data

US 2014/0119685 A1     May 1, 2014

(51) Int. Cl.
*F16C 33/38* (2006.01)
*F16C 33/60* (2006.01)
*F16C 19/16* (2006.01)

(52) U.S. Cl.
CPC ............ *F16C 33/3806* (2013.01); *F16C 19/166* (2013.01); *F16C 33/60* (2013.01)
USPC .......................................... 384/528; 384/506

(58) Field of Classification Search
CPC .......... F16C 19/06; F16C 19/14; F16C 19/16; F16C 19/163; F16C 19/166; F16C 33/38; F16C 33/3806; F16C 33/583; F16C 33/585; F16C 33/586; F16C 19/02; F16C 33/42; F16C 33/422; F16C 33/425; F16C 33/58; F16C 33/60

USPC ......... 384/506, 513, 516, 523, 524, 526, 528, 384/530, 560, 586
See application file for complete search history.

(56) References Cited

U.S. PATENT DOCUMENTS

| | | | | | |
|---|---|---|---|---|---|
| 1,325,635 | A | * | 12/1919 | Gurney | 384/523 |
| 1,379,945 | A | * | 5/1921 | Teetsow | 384/504 |
| 1,464,316 | A | * | 8/1923 | Gillespie | 384/506 |
| 2,381,730 | A | * | 8/1945 | Ellis | 384/446 |
| 3,647,268 | A | * | 3/1972 | Haines | 384/516 |
| 4,345,799 | A | * | 8/1982 | Crofts | 384/470 |
| 4,993,849 | A | * | 2/1991 | Radinger et al. | 384/447 |
| 6,158,896 | A | * | 12/2000 | Zernickel et al. | 384/506 |
| 6,318,899 | B1 | * | 11/2001 | Boyd | 384/492 |
| 6,386,764 | B1 | * | 5/2002 | Moore et al. | 384/448 |
| 6,837,623 | B2 | * | 1/2005 | Shirokoshi et al. | 384/516 |
| 7,448,806 | B2 | * | 11/2008 | Ishiguro et al. | 384/417 |
| 8,065,867 | B2 | * | 11/2011 | McCutchan | 60/226.1 |
| 2004/0032998 | A1 | * | 2/2004 | Iwata et al. | 384/513 |

* cited by examiner

*Primary Examiner* — Alan B Waits
(74) *Attorney, Agent, or Firm* — James Dottavio; MacMillan, Sobanski & Todd, LLC

(57) ABSTRACT

A bearing includes a first race including first and second segments, forming aligned pairs of first surfaces, spaced angularly about an axis; a second race including second surfaces, each second surface aligned with one of the pairs of first surfaces; balls, each ball contacting the surfaces of the first and second races; and a cage retaining each ball and engaging the first and second segments.

19 Claims, 4 Drawing Sheets

BALL BEARING HAVING SEGMENTED AND INTEGRAL RACES

BACKGROUND OF THE INVENTION

1. Field of the Invention

This invention relates generally to a ball bearing that supports components in rotation, particularly in applications where axial thrust loads are present.

2. Description of the Prior Art

To improve power density, there is a need to maximize ball fill and contact load capacity over that in regular single row deep groove ball bearings (DGBBs) using the standard Conrad design and method of assembly. Holding split bearing race segments together for both shipping and assembly present a problem.

Greater radial load capacity using additional balls can be achieved having a slot in one or both of the bearing races. This allows more radial capacity than the Conrad design but it severely reduces axial capacity, which is inappropriate for applications in which thrust loads can force the balls out of the slot.

An alternative is to use split-ring ball bearings, where one of the races is split in the middle to allow for more balls to be assembled in it. Unfortunately, handling and assembly suffer as the two halves of the split race are not retained together until installation. This also allows for more opportunity for mechanical damage and contamination until the whole open assembly is closed.

SUMMARY OF THE INVENTION

A bearing includes a first race including first and second segments, forming aligned pairs of first surfaces, spaced angularly about an axis; a second race including second surfaces, each second surface aligned with one of the pairs of first surfaces; balls, each ball contacting the surfaces of the first and second races; and a cage connecting each ball, engaging the first and second segments with a force that holds the segments in mutual contact.

Either the inner or outer race is formed in one piece; the other race is formed in two segments.

Contact between the ball and whole race can be at one central point, or at two points as with a Gothic arch bearing.

The ball may contact one or both of the segmented races when the segmented races are asymmetric.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
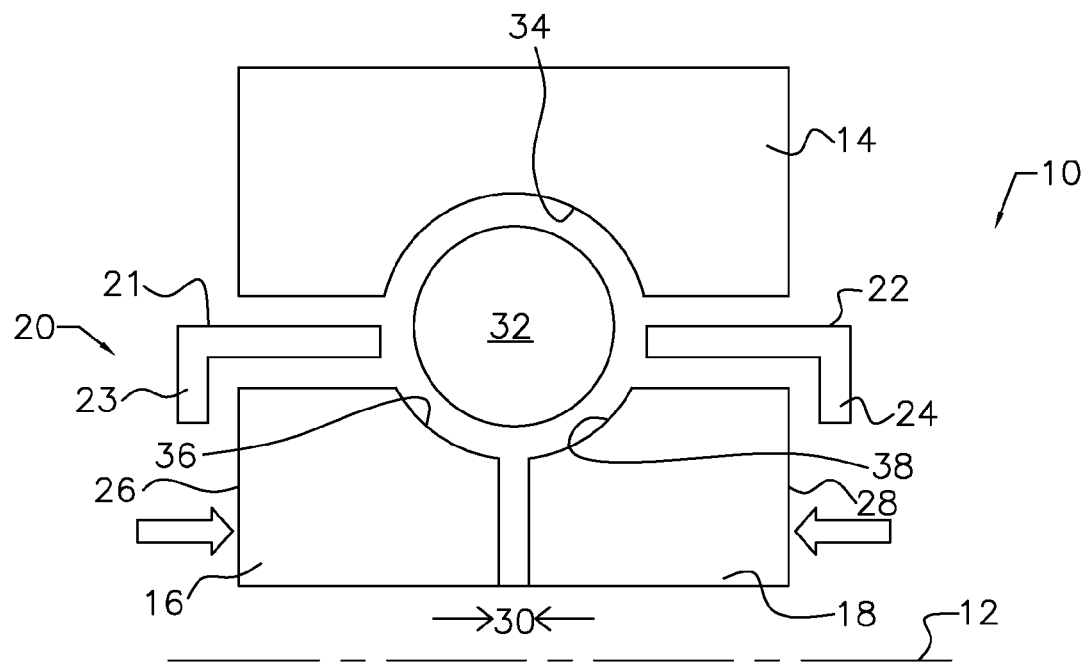
FIG. 1 is an end view of a bearing with its component in spaced-apart relation.

FIG. 1 illustrates a bearing 10 that is symmetrical about an axis 12. The bearing includes an outer race 14, split inner races 16, 18 and a cage 20, formed with tabs 21, 22, which extend laterally. Cage tab 21 includes a leg 23 and cage tab 22 includes a leg 24. Each of the legs 23, 24 extends toward the axis 12 and overlaps the outer faces 26, 28 of the split races 16, 18 when the cage 20 is press-formed radially inward, thereby providing lateral continuity between races 16, 18.

The gap 30 between the races 16, 18 is retained by press-forming the legs 23, 24 of the tabs 21, 22 such that the legs 23, 24 bear with a running clearance to the outer faces 26, 28 when the bearing 10 is in its assembled condition. The legs 23 and 24 are to have running clearance to the race surfaces, so as to retain the assembly in the uninstalled state, but minimize sliding friction in operation. A shaft/bore fastener may be used to close and/or preload the gap 30, as with other bearings. The external shaft/bore fastener or some external device or preload would produce the axial force.

A spherical ball 32 enclosed by the races 14, 16, 18, contacts at least a portion of the concave spherical inner surfaces 34, 36, 38 of races 14, 16, 18.

Figure 2:
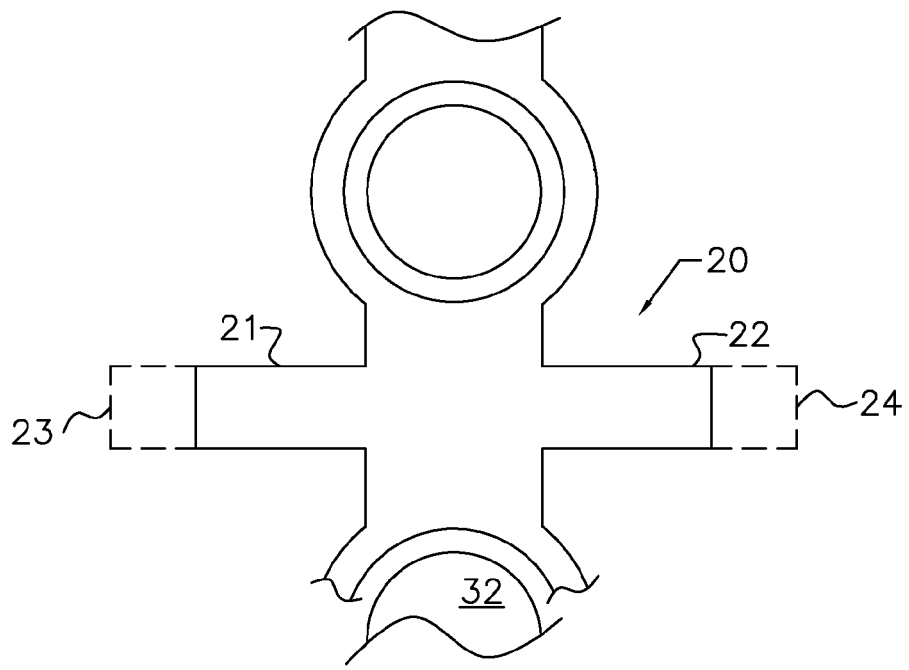
FIG. 2 is a top view of a portion of the bearing of FIG. 1.

FIG. 2 shows that the cage 20 is continuous about axis 12 and encircles each of the balls 32. Each pair of tabs 21, 22 is in a circumferential location between the balls 32.

Figure 3:
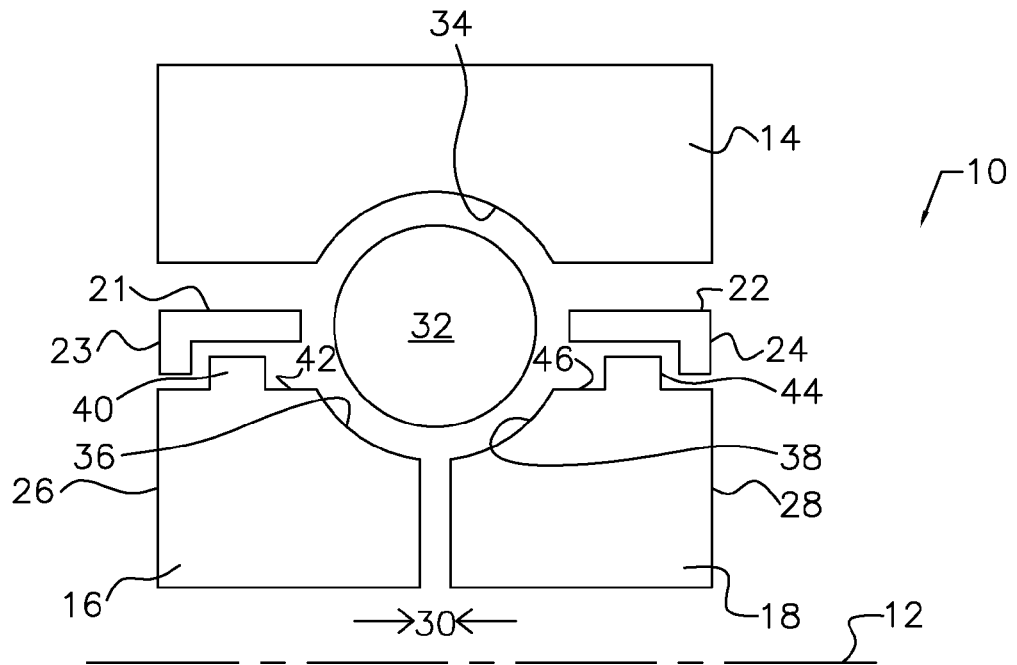
FIG. 3 is an end view of an alternate configuration of the bearing of FIG. 1.

In the bearing configuration shown in FIG. 3, split race 16 is formed with a rib 40, which extends radially from the upper surface 42 of race 16 and along the circumference of surface 42. Similarly, split race 18 is formed with a rib 44 that extends radially from the upper surface 46 of race 18 and along the circumference of race 18.

The gap 30 between the races 16, 18 is closed by press-forming the legs 23, 24 of the tabs 21, 22 such that the legs bear with a running clearance to the outer lateral faces of ribs 40, 44 when the bearing 10 is in its assembled condition, thereby providing lateral continuity between races 16, 18.

Figure 4:
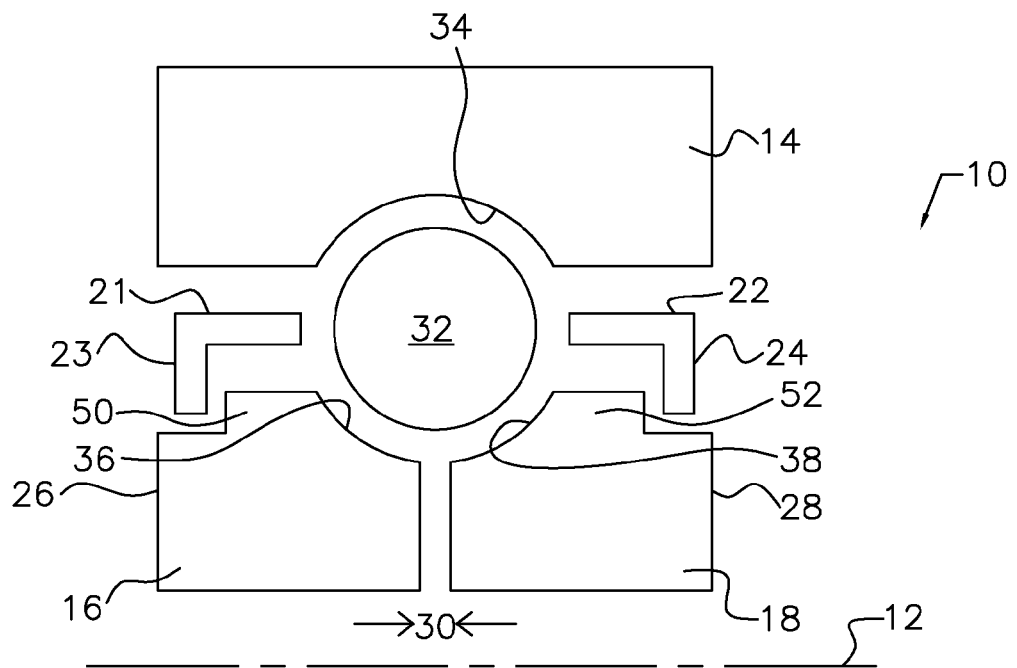
FIG. 4 is an end view of an alternate configuration of the bearing of FIGS. 1 and 2.

In the bearing configuration shown in FIG. 4, split race 16 is formed with a shoulder 50, which extends along the circumference race 16. Similarly, split race 18 is formed with a shoulder 52, which extends along the circumference of race 18.

The gap 30 between the races 16, 18 is retained by press-forming the legs 23, 24 of the tabs 21, 22 such that the legs bear with a running clearance relative to the outer lateral faces of shoulder 50, 52 when the bearing 10 is in its assembled condition, thereby providing lateral continuity between races 16, 18.

Figure 5:
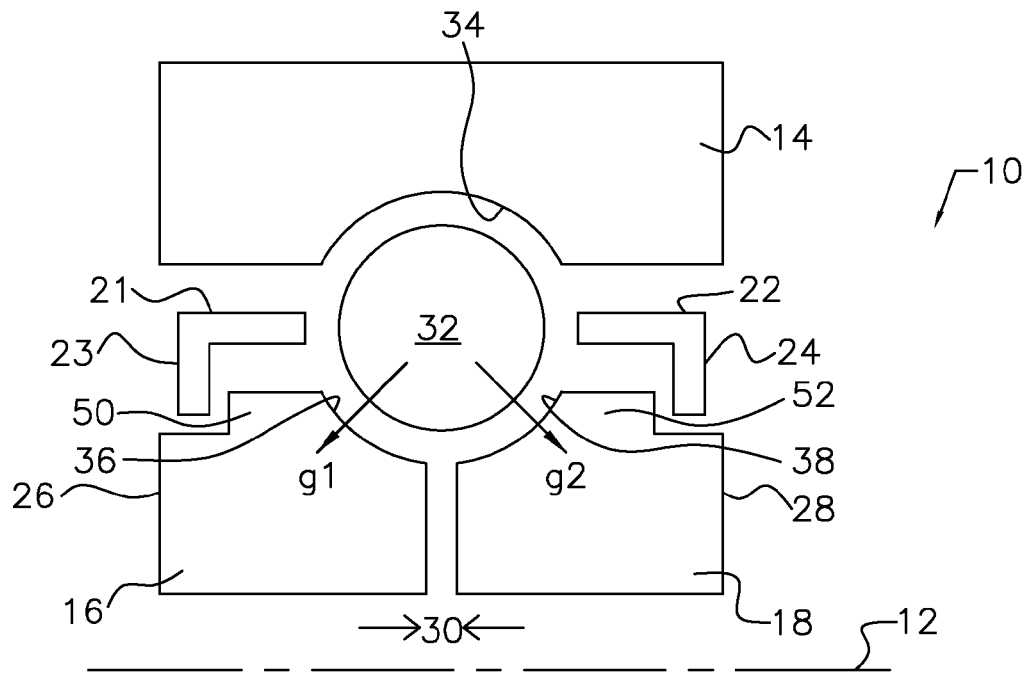
FIG. 5 is an end view of the bearing configuration of FIG. 4 showing the split races spaced by unequal radial lengths from the ball.

In the bearing configuration shown in FIG. 5 the split races 16, 18 are spaced by unequal radial lengths from the ball 32. The internal radius of curvature of concave spherical surface 36 is shorter than the internal radius of curvature of concave spherical surface 38, thereby producing a gap g1 between the outer surface of ball 32 and surface 36 that is smaller than the gap g2 between the outer surface of ball 32 and surface 38. The centerpoint of the internal radius of curvature of concave spherical surface 36 may also be axially and/or radially offset in space from the internal radius of curvature of concave spherical surface 38, thereby aligning gap g1 differently than gap g2 to allow for asymmetric loading and contact stress characteristics between ball 32 and surfaces 34, 36, 38.

Due to the asymmetric race profiles of surfaces 36, 38, pairs of bearings can be arranged such that greater radial and axial load capacity in one axial direction can be achieved in one member of the pair and greater radial and axial load capacity in the opposite axial direction can be achieved in the other member of the pair, thereby providing reactions bi-directional axial thrust loads at the bearing pair.

Figure 6:
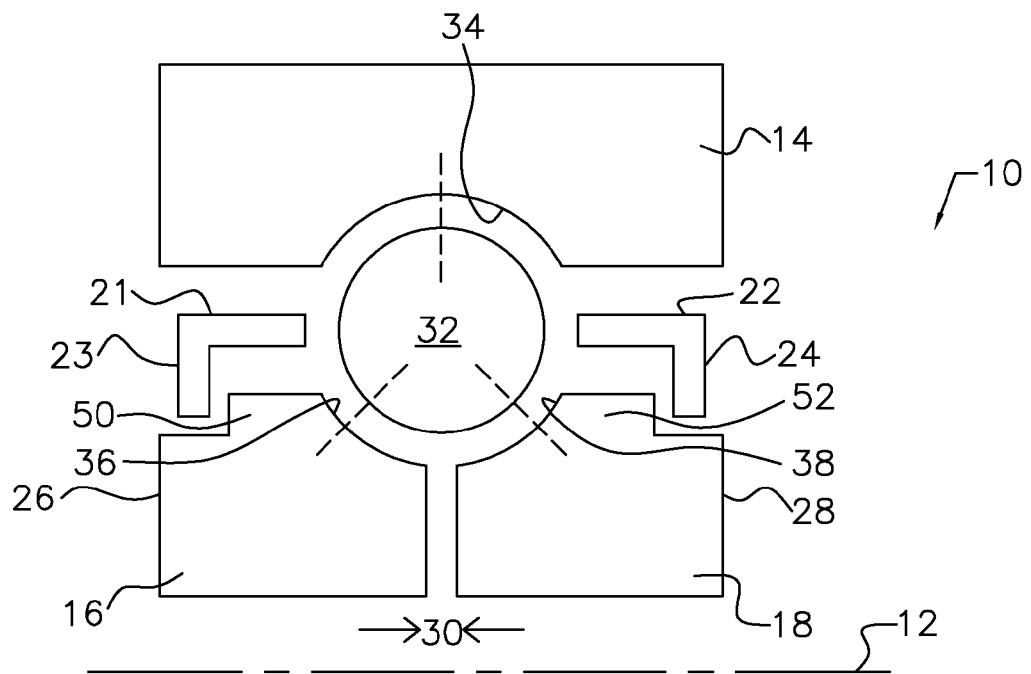
FIG. 6 is an end view showing ball contact on the races, each over a single contact area.

FIG. 6 is an end view showing contact between ball 32 and the races 14, 16, 18. Because the radius of curvature of each concave spherical surface 34, 36, 38 is greater than the radius of the ball 32, the range of contact on each race 14, 16, 18 occurs at a single contact area that is less than the entire area of each surface 34, 36, 38.

Figure 7:
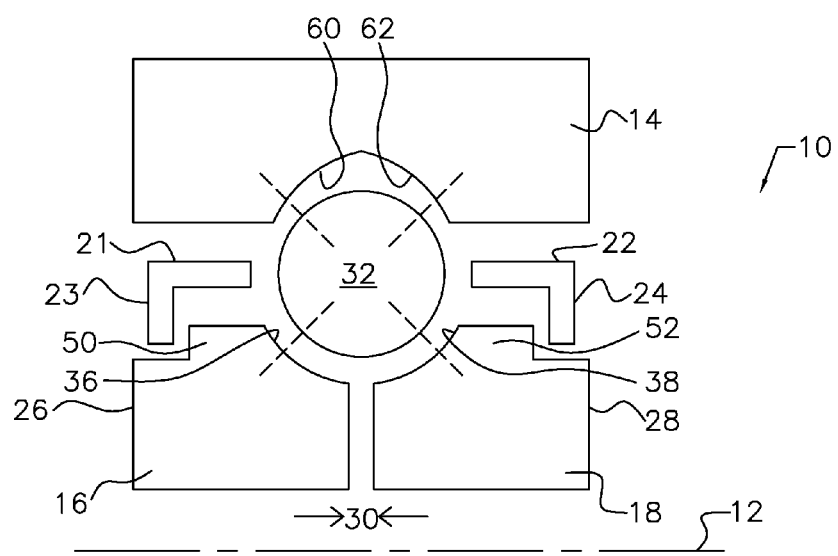
FIG. 7 is an end view showing ball contact on the solid race at multiple contact areas.

FIG. 7 is an end view showing ball contact between ball 32 and the races 14, 16, 18. Because the radius of curvature of each concave spherical surface 36, 38 is greater than the radius of the ball 32, the range of contact on races 16, 18 occurs at a single contact area that is less than the entire area of surfaces 36, 38.

FIG. 7 shows that the inner surface of race 14 has the form of a Gothic arch. Because the inner surface of race 14 comprises two spherical surfaces 60, 62 each having a center of curvature that is offset from the center of ball 32 and mutually non-coincident, the range of contact on race 14 occurs at multiple contact areas, the sum of the areas being less than the entire area of surfaces 60, 62.

In each of the configurations, the one piece race, such as race 14, may be either the inner race or the outer race, and the other race may comprise two parts, such as the race portions 16, 18.

In accordance with the provisions of the patent statutes, the preferred embodiment has been described. However, it should be noted that the alternate embodiments can be practiced otherwise than as specifically illustrated and described.

The invention claimed is:

1. A bearing, comprising:
    a first race including a first segment including a first surface and a second segment including a first surface that aligns with the first segment first surface in an aligned pair of first surfaces, the pair of first surfaces spaced axially relative to an axis;
    a second race including second surfaces, each second surface aligned with a respective one of the first surfaces;
    balls, each ball located in an annular space between the first and second races;
    a cage maintaining each ball in spaced relation and including first tabs circumferentially spaced apart along a circumferential length of the bearing, with each first tab extending axially from a location between respective adjacent balls and in a first lateral direction, each first tab including a first leg directed along a surface of the first segment to retain the first segment, and the cage including second tabs extending in a second lateral direction and configured to retain the second segment to create a gap between the segments.

2. The bearing of claim 1, wherein the pair of first surfaces comprises a concave surface with a constant radius of curvature contacted by the balls.

3. The bearing of claim 1, wherein:
    the first surface of the first segment is a concave surface with a first constant radius of curvature, and contacted by the balls;
    the first surface of the second segment is a concave surface with a second constant radius of curvature, and contacted by the balls, the second constant radius of curvature greater than the first constant radius of curvature.

4. The bearing of claim 1, wherein:
    the first surface of the first segment is a concave surface with a first constant radius of curvature, and contacted by the balls;
    the first surface of the second segment is a concave surface with a second constant radius of curvature, not contacted by at least one of the balls when subjected to a predetermined asymmetrical loading, the second constant radius of curvature greater than the first constant radius of curvature.

5. The bearing of claim 1, wherein each of the second surfaces is a concave surface with a constant radius of curvature and contacted by the balls.

6. The bearing of claim 1, wherein one of the second surfaces comprises
    a third concave surface having a center of curvature at a first point; and
    another of the second surfaces comprises a fourth concave surface having a center of curvature at a second point that is not coincident with the first point.

7. The bearing of claim 1, wherein one of the second surfaces comprises
    a third concave surface having a center of curvature at a first point; and
    another of the second surfaces comprises a fourth concave surface having a center of curvature at a second point that is not coincident with the first point, the third surface being contacted by the balls over a first range of contact, the fourth surface being contacted by the balls over a second range of contact that is spaced from the first range of contact.

8. The bearing of claim 1, wherein each of the balls is a sphere.

9. The bearing of claim 1, wherein the cage further comprises:
    each of the first legs are directed along an outer surface of the first segment to retain the outer surface of the first segment;
    the second tabs circumferentially spaced apart along the circumferential length of the bearing, with each second tab extending axially from a location between respective adjacent balls in a second lateral direction, each second tab including a second leg directed along an outer surface of the second segment to retain the outer surface of the second segment.

10. The bearing of claim 1, wherein:
    the first race includes first and second laterally spaced ribs, each rib extending radially from and circumferentially along the first race; and
    the cage further comprises:
    each of the first legs directed along an outer surface of the first rib to retain the first rib;
    the second tabs circumferentially spaced apart along the circumferential length of the bearing, with each second tab extending axially from a location between respective adjacent balls in a second lateral direction, each second tab including a second leg directed along an outer surface of the second rib to retain the second rib.

11. The bearing of claim 1, wherein:
    the first race includes first and second laterally spaced shoulders, each shoulder extending radially from and circumferentially along the first race; and
    the cage further comprises:
    each of the first legs directed along an outer surface of the first shoulder to retain the first shoulder;

the second tabs circumferentially spaced apart along the circumferential length of the bearing, with each second tab extending axially from a location between respective adjacent balls in a second lateral direction, each second tab including a second leg directed along an outer surface of the second shoulder to retain the second shoulder.

12. A bearing, comprising:
a first race including a first segment including a first surface and a second segment including a first surface that aligns with the first segment first surface in an aligned pair of first surfaces, the pair of first surfaces spaced axially relative to an axis, the pair of first surfaces comprising a pair of concave surfaces, each with a constant radius of curvature;
a second race including concave second surfaces with a constant radius of curvature, each second surface aligned with a respective one of the first surfaces;
balls, each ball located between the first and second races;
a cage maintaining each ball in spaced relation and including first tabs circumferentially spaced apart along a circumferential length of the bearing, with each first tab extending axially from a location between respective adjacent balls and in a first lateral direction, each first tab including a first leg directed along a surface of the first segment to retain the first segment, and the cage including second tabs extending in a second lateral direction and configured to retain the second segment to create a gap between the segments.

13. The bearing of claim 12, wherein the cage further comprises:
each of the first legs are directed along an outer surface of the first segment to retain the outer surface of the first segment;
the second tabs circumferentially spaced apart along the circumferential length of the bearing, with each second tab extending axially from a location between respective adjacent balls in a second lateral direction, each second tab including a second leg directed along an outer surface of the second segment to retain the outer surface of the second segment.

14. The bearing of claim 13, wherein:
the first surface of the first segment is contacted by the balls;
the first surface of the second segment is not contacted by at least one of the balls when subjected to a predetermined asymmetrical loading, the constant radius of curvature of the first surface of the second segment is greater than the constant radius of curvature of the first surface of the first segment.

15. The bearing of claim 12, wherein:
the first race includes first and second laterally spaced shoulder, each shoulder extending radially from and circumferentially along the first race; and
the cage further comprises:
each of the first legs directed along an outer surface of the first shoulder to retain the first shoulder;
the second tabs circumferentially spaced apart along the circumferential length of the bearing, with each second tab extending axially from a location between respective adjacent balls in a second lateral direction, each second tab including a second leg directed along an outer surface of the second shoulder to retain the second shoulder.

16. A bearing, comprising:
a first race including a first segment having a circumferentially extending first surface and a second segment having a circumferentially extending second surface;
a second race including a third concave surface having a center of curvature at a first point; and a fourth concave surface, adjacent to the third surface and having a center of curvature at a second point that is not coincident with the first point;
balls, each ball located in an annular space between the first and second races;
a cage maintaining each ball in spaced relation and including first tabs circumferentially spaced apart along a circumferential length of the bearing, with each first tab extending axially from a location between respective adjacent balls and in a first lateral direction, each first tab including a first leg directed along a surface of the first segment to retain the first segment, and the cage including second tabs extending in a second lateral direction and configured to retain the second segment to create a gap between the segments.

17. The bearing of claim 16, wherein the third surface is contacted by one of the balls over a first range of contact, and the fourth surface is contacted by said one of the balls over a second range of contact that is spaced from the first range of contact.

18. The bearing of claim 16, wherein the cage further comprises:
each of the first legs are directed along an outer surface of the first segment to retain the outer surface of the first segment;
the second tabs circumferentially spaced apart along the circumferential length of the bearing, with each second tab extending axially from a location between respective adjacent balls in a second lateral direction, each second tab including a second leg directed along an outer surface of the second segment to retain the outer surface of the second segment.

19. The bearing of claim 16, wherein:
the first race includes first and second laterally spaced shoulder, each shoulder extending radially from and circumferentially along the first race; and
the cage further comprises:
each of the first legs directed along an outer surface of the first shoulder to retain the first shoulder;
the second tabs circumferentially spaced apart along the circumferential length of the bearing, with each second tab extending axially from a location between respective adjacent balls in a second lateral direction, each second tab including a second leg directed along an outer surface of the second shoulder to retain the second shoulder.

* * * * *